United States Patent [19]

Minolla

[11] 3,715,144
[45] Feb. 6, 1973

[54] SAFETY BELT CONSTRUCTION

[75] Inventor: Horst Minolla, Norderstedt, Germany

[73] Assignee: Klippan GmbH, Nordestedt, Germany

[22] Filed: Sept. 16, 1970

[21] Appl. No.: 72,773

[30] Foreign Application Priority Data

Sept. 19, 1969 Germany.....................P 19 47 438.5

[52] U.S. Cl. ..............................................297/386
[51] Int. Cl. ............................................A62b 35/60
[58] Field of Search .....297/357, 388, 386; 242/10.1, 242/10.7; 74/53

[56] References Cited

UNITED STATES PATENTS

| | | | |
|---|---|---|---|
| 3,323,749 | 6/1967 | Karlsson | 297/388 X |
| 3,369,768 | 2/1968 | Burns | 297/388 X |
| 3,138,405 | 6/1964 | Hanway | 298/386 |
| 3,174,704 | 3/1965 | Replogle | 297/388 UX |
| 3,343,765 | 9/1967 | Baker | 297/388 X |
| 3,347,488 | 10/1967 | Quinting | 297/388 X |
| 3,410,153 | 11/1968 | Merna, Jr. | 297/386 X |
| 3,550,875 | 12/1970 | Settimi | 297/388 X |
| 3,606,454 | 9/1971 | Dorn | 297/385 |

*Primary Examiner*—Bobby R. Gay
*Assistant Examiner*—Glenn O. Finch
*Attorney*—Michael S. Striker

[57] ABSTRACT

A safety belt has an end portion and a housing mounts a structural element which is at least in part rotatable with concomitant displacement longitudinally of its axis of rotation. Deformable means, for instance a ring confined between portions of the housing and an axial end of the structural element, is provided and so associated with the structural element that it is deformed by the same when the structural element is displaced longitudinally of its axis of rotation in response to the pull upon the safety belt section exceeding a predetermined level of force.

3 Claims, 4 Drawing Figures

PATENTED FEB 6 1973 3,715,144
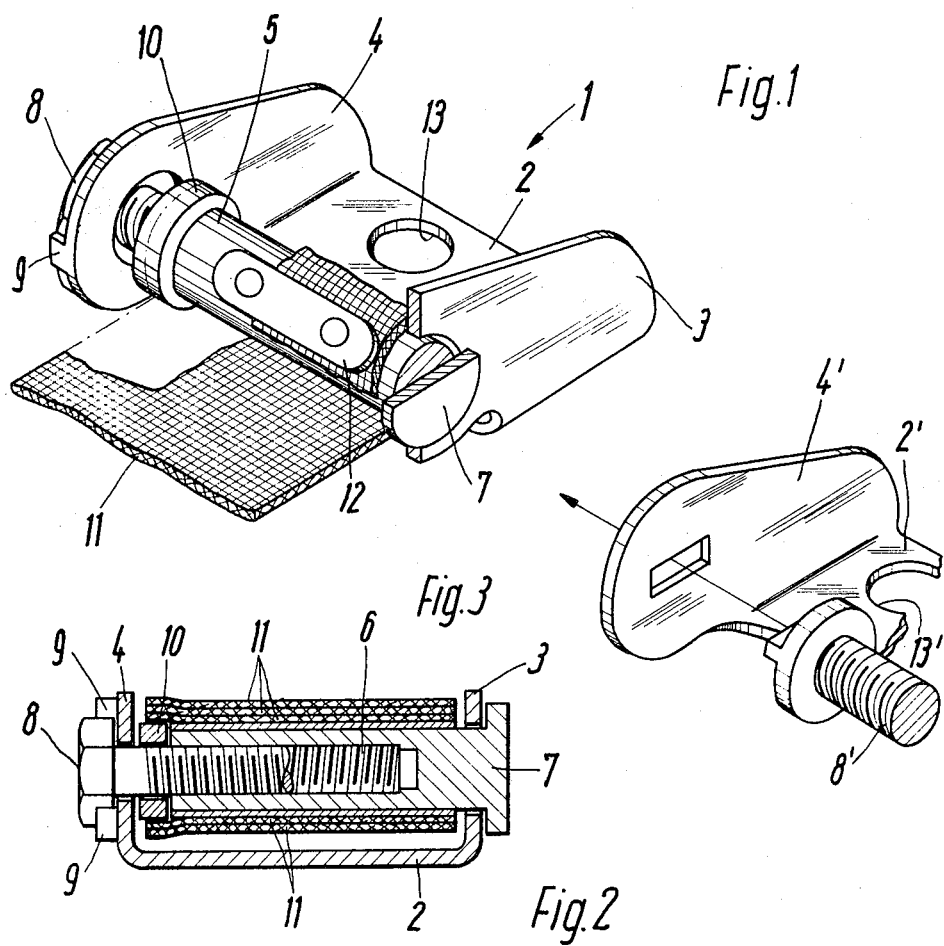
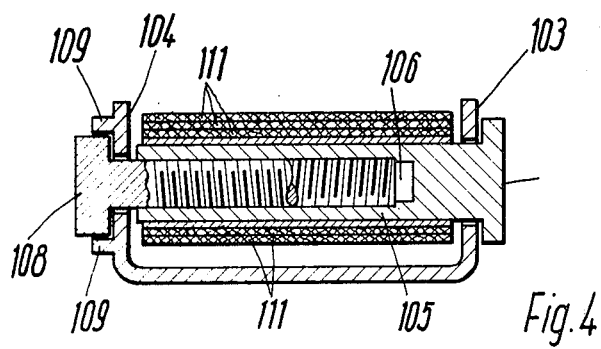
Inventor:
HORST MINOLLA

SAFETY BELT CONSTRUCTION

BACKGROUND OF THE INVENTION

The present invention relates generally to a safety belt construction, and more particularly to a safety belt construction having an improved kinetic force dissipator.

With the ever-increasing number of automobiles on the road the number of accidents involving automobiles is undergoing a similar rise. In the United States alone, the number of persons dead or maimed as a result of automobile accidents reaches tens of thousands every year. The use of safety equipment in conjunction with automobiles is therefore becoming more and more important, and among this safety equipment the single device currently best known and in widest use is the safety belt which is also sometimes known as a seat belt. The simpler type of such belts known as lap belts because they surround the abdominal area of the wearer, comprises two belt sections each of which is anchored with one end to the vehicle whereas the opposite free ends are provided with releasable interengaging locks or clasps. The present invention will be explained hereafter with reference to such a belt, although it is to be specifically understood that the invention is not limited to use with this particular type of belt but can also be used with the type known as a shoulder belt, with combined shoulder and lap belts, and with safety belts used in other applications than in motor vehicles, for instance in aircraft.

In the event of an accident, and with the belt in position, it is known that the belt undergoes plastic as well as elastic deformation as a result of the kinetic energy generated by the tendency of the body of the wearer to continue travelling when the vehicle suddenly stops, for instance due to a collision. Elastic deformation of the belt beyond a very small extent is undesirable and dangerous because the very strong recovery force acting upon the wearer when the elastic deformation has reached its maximum extent tends to hurl the wearer back into his seat with such violence that there exists the danger of physical injury to the wearer; usually the wearer's neck will be broken.

Plastic deformation of the belt, however, is desirable because it results in a dissipation—i.e. destruction—of the kinetic energy and thus acts to damp the shock to the wearer. However, considering the construction and physical characteristics required of the belt in order to be able to withstand the forces which may act upon it, it is found that sufficient energy dissipation as a result of plastic deformation of the belt can occur only due to forces acting upon the belt which are of such magnitude that they would be fatal to the wearer. Realizing this, the prior art has already provided safety belt constructions wherein the kinetic energy is dissipated by special deformable arrangements when the force acting upon the belt reaches a predetermined level. In other words when a level is reached which should not be exceeded because of possible danger to the wearer, the deformable arrangements become deformed and thereby dissipate and destroy the kinetic energy. Such a construction of the prior art is disclosed in German allowed application DAS 1 296 529 where the deformable arrangement is in form of a strip of metallic material which, after a predetermined level of force upon the belt has been reached, is withdrawn from a roller and continuously undergoes deformation as it becomes so withdrawn while being wound onto the shaft to which an end of the seat belt is secured. This construction is, in fact, very efficient and no criticism is made of its effectiveness for the intended purpose.

However, what is undesirable in the prior art is the fact that the prior-art constructions must necessarily be rather bulky because of the need to provide a special roller and the metallic tape which is convoluted about this roller. This is disadvantageous, however, because when the device is installed it is located in the passage or compartment of the vehicle and takes up significant space; depending on its positioning it may even be a hindrance in entering and leaving the vehicle.

SUMMARY OF THE INVENTION

It is, accordingly, an object of the present invention to provide an improved safety belt construction of the type under discussion which affords the aforementioned desirable advantages but avoids the also discussed disadvantages.

More particularly it is an object of the present invention to provide such an improved seat belt construction which includes a force dissipator of relatively small dimensions and which is inexpensive to produce.

A concomitant object is, of course, to provide such an improved safety belt construction which is highly reliable in its operation.

Still a further object of the invention is to provide such an improved safety belt construction which can be continued to use even after deformation of the deformable component or components thereof has occurred, by simply replacing the component or components with new ones.

In pursuance of the above objects, and others which will become apparent hereafter, one feature of the invention resides, briefly stated, in a safety belt for automotive vehicles and the like which comprises a safety belt section having an end portion and a housing in which a structural element is mounted so as to be at least in part rotatable with concomitant displacement longitudinally of its axis of rotation. The end portion of the safety belt section is fast with and convoluted about the element so that the latter tends to rotate in response to a pull exerted on the section. Deformable means is operatively associated with the structural element for undergoing deformation in response to longitudinal displacement of the element upon the pull exceeding a predetermined level of force.

By resorting to the present invention as briefly outlined above with reference to one embodiment, the necessity for one or more coils of convoluted metal tape is avoided whereby the construction can inherently be smaller than what is known from the prior art. Furthermore, the construction and assembly of a device according to the present invention is substantially simplified because fewer individual components are required.

The deformable means may be in form of separate elements provided for this purpose and which can readily be replaced when deformed with undeformed new ones, or it may be constituted by portions of the housing itself. A determination of the force level at which deformation with concomitant dissipation of kinetic energy begins, can be made by requisite selection of the material of the deformable element or elements—i.e. by selecting the material as to its strength characteristics—and/or by the structural configuration of the elements or element Thus, the maximum force which can act upon the belt (and therefore upon the user) before dissipation of the kinetic energy due to deformation of the deformable means takes place, can be precisely predetermined.

The novel features which are considered as characteristic for the invention are set forth in particular in the appended claims.

The invention itself, however, both as to its construction and its method of operation, together with additional objects and advantages thereof, will be best understood from the following description of preferred embodiments when read in connection with the accompanying drawing.

BRIEF DESCRIPTION OF THE DRAWING

FIG. 1 is a partially sectioned perspective view illustrating one embodiment according to the present invention;

FIG. 2 is a section taken on line II—II of FIG. 1;

FIG. 3 is a fragmentary perspective detail view, on an enlarged scale, illustrating a further embodiment of the invention; and FIG. 4 is a view similar to FIG. 2 but illustrating yet another embodiment of the invention.

DESCRIPTION OF THE PREFERRED EMBODIMENTS

Discussing now firstly the embodiment illustrated in FIGS. 1 and 2, it will be seen that reference numeral 1 identifies a housing having a bottom or transverse wall and two lateral or side walls 3 and 4 which are rigid with or of one piece with the bottom wall 2 and are transversely spaced; in the illustrated embodiment they are parallel but strict parallelism is not an absolute requirement. A shaft 5 is turnably journalled in the side wall 3 and is of hollow construction as FIG. 2 indicates. The interior space of the shaft 5 is identified with reference numeral 6 and is tapped, that is internally screw threaded. The shaft 5 is provided with a head 7 which abuts against the outer side of the side wall 3, a portion of the shaft 5 extending through an aperture provided for this purpose in the side wall 3 as a comparison of FIGS. 1 and 2 clearly indicates.

A bolt or screw 8, exteriorly threaded as illustrated, extends into the space 6 and its exterior threads mesh with the interior threads provided in the space 6. The head of the bolt 8, which latter extends through a similar aperture provided in the side wall 4, abuts against the exterior side of the side wall 4 as shown in FIG. 2, projections or other abutments 9 being provided on the side wall 4 to prevent the head 8 from turning.

Deformable means in this embodiment is provided in form of a deformable annulus 10 which surrounds the screw 8 adjacent the inner side of the side wall 4 and is capable of being axially deformed. This characteristic may be due to the selection of the material for the annulus 10, due to the configuration chosen for it (which latter possibility is not the case in the embodiment of FIGS. 1 and 2), or to a combination of these factors. One axial end of the annulus 10 abuts the inner side of the side wall 4 and its other axial end abuts against that end of the shaft 5 which is remote from the head 7.

An end portion of a safety belt section 11 is fast with the shaft 5 as shown in FIG. 1, for which purpose it is connected to the shaft 5 at 12. A portion of the safety belt section 11 is convoluted about the shaft 5 and it will be appreciated that if a pull is exerted on the section 11 in the direction towards the left in FIG. 1, that is away from the shaft 5, the section 11 unwinds from the shaft 5, turning the latter about its longitudinal axis of rotation. Because of the meshing of the screw threads of shaft 5 and screw 8 the shaft 5 shifts axially with reference to the screw 8, that is towards the left in FIGS. 1 and 2. The head 7 has sufficient play with respect to the side wall 3 to permit such shifting and the shaft 5 thus exerts, when the section 11 unwinds from the shaft 5 and when the force acting upon the section 11 is sufficiently large, compresses the annular member 10 against the inner side of the side wall 4. In the illustrated embodiment the annular member 10 is of a material sufficiently soft to permit it to become axially deformed when the force acting upon it reaches a certain selected level, and such axial deformation results in a dissipation and destruction of the kinetic energy acting upon the section 11, so that the force which can act upon the belt (only the section 11 is illustrated but normally there will be two sections which can be connected by a suitable clasp or lock) is limited to the level necessary to effect the aforementioned plastic deformation of the element 10.

The embodiment in FIG. 4 is quite similar to that of FIGS. 1 and 2. Here, however, the element 10 has been omitted and the plastically deformable means is constituted by the side walls 103 and 104 which are deformed in direction inwardly towards one another in response to axial displacement of the shaft 105 (having the head 107) with reference to the screw 108. Reference numeral 109 identifies abutments similar to those identified with reference numeral 9 in FIGS. 1 and 2, reference numeral 111 identifies the belt section corresponding to the section 11 in FIGS. 1 and 2.

It is self-evident that a reverse arrangement from that shown in FIG. 4 can be provided within the scope of the invention. Thus, the side walls 103 and 104 would then be deformed in direction outwardly away from one another rather than inwardly towards one another. If this is desired, an arrangement may be provided such as is diagrammatically shown in FIG. 3. There, the externally screw-threaded element 8' is provided with a cylindrical head having at its outer side a projection 8a which mates with a correspondingly configurated aperture 4a provided in the side wall 4' of a housing, as indicated by the arrow. The bottom wall of the housing is identified with reference numeral 2' and it will be appreciated that another side wall similar to the side wall 4' will be provided at the other side, similar to the construction shown in FIG. 1. The element 8' corresponds to the screw 8 of FIGS. 1 and 2, and the embodiment of FIG. 3 will additionally utilize a hollow shaft corresponding to the one identified with reference numeral 5 in FIGS. 1 and 2, and which is not illustrated in FIG. 3. The head of this hollow shaft, corresponding to head 7 in FIGS. 1 and 2, will be journalled in the same manner as the head 7. However, this head will be located at the inner side of the side wall corresponding to the side wall 3 of FIGS. 1 and 2 so that when rotation of the non-illustrated shaft occurs with reference to the element 8', the shaft will tend to become unscrewed from the element 8' (a requisite selection of their mating screw threads having been made for this purpose) whereby the heads of the shaft and of the element 8' exert outwardly directed pressure upon the side walls of the housing and deform the same in direction outwardly away from one another.

Still a further embodiment of the invention is a modification of the one shown in FIG. 4 according to which the shaft 105 of FIG. 4 may be configurated in form of a screw or bolt provided with an exterior thread. The screw 108 of FIG. 4 may then be replaced with a nut which is secured against rotation on the side wall 4, for instance at the outer side thereof and with which the screw meshes. In such a construction the side walls 103 and 104 will again be inwardly deformed towards one another.

Naturally, still further embodiments are possible within the scope of the invention. Thus, in an embodiment analogous to that of FIGS. 1 and 2, for example, it could be the shaft 5 which is stationary and the screw 8 which is turnable. In so far as the choice is concerned between making the deformable means in form of a separate element such as the one identified with reference numeral 10 in FIG. 1, or making it part of the housing such as the side walls 103 and 104 in FIG. 4, the only point to be considered is the fact that with an embodiment where the deformable element is a discrete element, as in FIG. 1, it can be replaced with a new undeformed one subsequent to use, so that the seat belt construction can continue to be used whereas in the case of an embodiment such as shown in FIG. 4 at least the housing would have to be discarded. Naturally, the arrangement of the element 10 and its configuration could be different from what is illustrated.

It will be understood that each of the elements described above, or two or more together, may also find a useful application in other types of constructions differing from the types described above.

While the invention has been illustrated and described as embodied in a safety belt construction, it is not intended to be limited to the details shown, since various modifications and structural changes may be made without departing in any way from the spirit of the present invention.

Without further analysis, the foregoing will so fully reveal the gist of the present invention that others can be applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. In a safety belt for automotive vehicles and the like, in combination, a safety belt section having an end portion; a housing comprising a pair of transversely spaced walls; a structural element including an elongated shaft comprising an internally threaded hollow sleeve portion having an open end and an other end rotatably mounted in one of said walls, and an externally threaded rod portion received in and meshing with said sleeve portion and having a free end rotatably mounted in the other of said walls, said element at least in part rotatable with concomitant displacement longitudinally of its axis of rotation, said end portion of said safety belt section being fast with and convoluted about said element so that the latter tends to rotate in response to a pull exerted upon said section; and deformable means including an annular element surrounding the axis of rotation of said structural element and being axially deformable in response to longitudinal displacement of said structural element, said deformable means operatively associated with said structural element for undergoing deformation in response to longitudinal displacement of said element upon said pull exceeding a predetermined level of force.

2. In a safety belt for automotive vehicles and the like, in combination, a safety belt section having an end portion; a housing comprising a pair of transversely spaced walls; a structural element including an elongated shaft comprising an internally threaded hollow sleeve portion having an open end and an other end rotatably mounted in one of said walls, and an externally threaded rod portion received in and meshing with said sleeve portion and having a free end rotatably mounted in the other of said walls, said end portion of said safety belt section being fast with and convoluted about said element so that the latter tends to rotate in response to a pull exerted upon said section; and deformable means comprising an annular element interposed between said other wall and said open end of said sleeve portion and axially deformable in response to longitudinal displacement of the latter, operatively associated with said structural element for undergoing deformation in response to longitudinal displacement of said element upon said pull exceeding a predetermined level of force.

3. In a safety belt for automotive vehicles and the like, in combination, a safety belt section having an end portion; a housing; a structural element mounted in said housing and at least in part rotatable with concomitant displacement longitudinally of its axis of rotation, said end portion of said safety belt section being fast with and convoluted about said element so that the latter tends to rotate in response to a pull exerted upon said section; and deformable means operatively associated with said structural element for undergoing deformation in response to longitudinal displacement of said element upon said pull exceeding a predetermined level of force, said deformable means comprising a discrete member replaceable with a similar but non-deformed member subsequent to occurrence of a deformation.

* * * * *